No. 790,873.

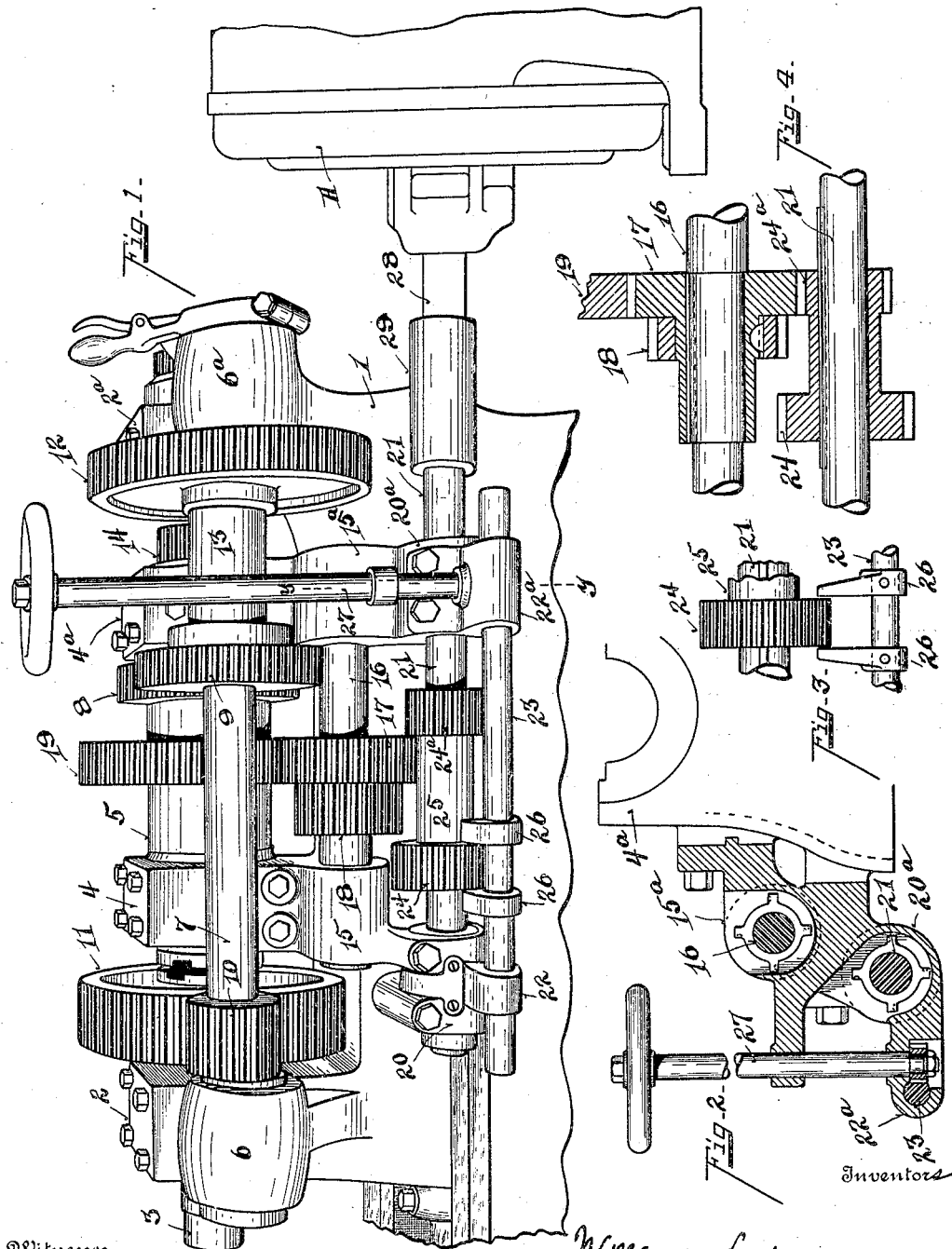

Patented May 23, 1905.

UNITED STATES PATENT OFFICE.

NICHOLAS D. CHARD AND WILLIAM LODGE, OF CINCINNATI, OHIO, ASSIGNORS TO THE LODGE & SHIPLEY MACHINE TOOL COMPANY, OF CINCINNATI, OHIO, A CORPORATION.

HEAD-STOCK FOR LATHES.

SPECIFICATION forming part of Letters Patent No. 790,873, dated May 23, 1905.

Application filed January 3, 1905. Serial No. 239,495.

*To all whom it may concern:*

Be it known that we, NICHOLAS D. CHARD and WILLIAM LODGE, citizens of the United States, residing at Cincinnati, in the county of Hamilton and State of Ohio, have invented certain new and useful Improvements in Head-Stocks for Lathes, of which the following is a specification.

Our invention relates to an improved head-stock for back gearing for motor-driven lathes.

The features of the invention are more fully set forth in the description of the accompanying drawings, forming a part of this specification, in which—

Figure 1 is a perspective view of the rear of a lathe-head and our improved back-gear arrangement for motor-drive. Fig. 2 is a section on line $y$ $y$, Fig. 1. Fig. 3 is a detail view of yoke arrangement for sliding the change-gears. Fig. 4 is a detail sectional view of the slide-gears and their respective intermeshing gear of the head-stock back-gearing system.

1 represents the head-stock, in which casting the following bearings are formed: 2 $2^a$ represent the bearings in which the spindle 3 is journaled. 4 $4^a$ represent the intermediate bearings in which the driving-sleeve 5 is journaled. 6 $6^a$ represent the bearings in which the back-gear shaft 7 is journaled.

8 represents a pinion on the driving-sleeve 5, intermeshed with a gear-wheel 9, fixed to shaft 7. 10 represents a gear-wheel at the other end of the shaft 7 in mesh with a gear 11 on the spindle 3. 12 represents another gear-wheel on shaft 7, connected with gear-wheel 9 by sleeve 13. Said gears 9 and 12 slide on and turn with shaft 7.

14 represents a gear-wheel on the driving member 5, adapted to be intermeshed with gear-wheel 12 when the gear-wheel 9 is thrown out of mesh with the gear-wheel 8.

The casting containing the bearings 4 $4^a$ is rearwardly projected to form the bearings 15 $15^a$, in which is journaled a stud-shaft 16. 17 18 represent gear-wheels on the stud-shaft 16, one of which—say 17—is intermeshed with the gear-wheel 19 on the driving-sleeve 5 to drive the sleeve. The casting containing bearings 4 $4^a$ and the bearings 15 $15^a$ are still farther projected rearwardly to form the bearings 20 $20^a$ for the driving-shaft 21 and the bearings 22 $22^a$ for the sliding rod 23. Thus this intermediate portion of the head-stock casting is rearwardly extended to form three pairs of bearings, just described. Upon the shaft 21 are the gear-wheels 24 $24^a$, connected by the sleeve 25 and adapted to slide on and turn with shaft 21. These gear-wheels are placed upon opposite sides of the gear-wheels 17 18 of the shaft 16, so that gear-wheel $24^a$ may be intermeshed with gear-wheel 17 or gear-wheel 24 may be intermeshed with gear-wheel 18 to give two initial speeds to the driving-sleeve 5. The rod 23, sliding in the bearings 22 $22^a$, has the yoke 26 straddling the gear-wheel 24.

27 represents an operating-shaft having a rack-and-gear connection with the sliding rod 23 (see Fig. 2) for shifting the gear-wheels 24 $24^a$.

The motor A has an armature-shaft 28 connected to the shaft 21 by the coupling 29. This constitutes a new and improved method of attaching a motor and its armature-shaft to the head-stock of a lathe, whereby it is possible to place it to the rear out of the way, at the same time getting several initial speeds between the armature and driving member.

It will be noted that none of the gear-wheels turn upon shafts, but that they are fixed to their shafts and that said shafts are journaled at each end in substantial bearings formed in the head-stock upon the rear of the spindle.

Having described our invention, we claim—

A head-stock for an engine-lathe having two upright pillow-blocks provided with main bearings, a spindle-driving member journaled therein, a driven gear-wheel fixed on said driving member, the said pillow-blocks each having a rearward projection in which are formed two parallel sets of bearings, stud-shafts journaled in said bearings, variable-speed gearing disposed on said stud-shafts in train with the driven gear-wheel, and means for rotating one of said stud-shafts, substantially as described.

In testimony whereof we have hereunto set our hands.

NICHOLAS D. CHARD.
WILLIAM LODGE.

Witnesses:
OLIVER B. KAISER,
LUISE BECK.